United States Patent Office 3,390,673
Patented July 2, 1968

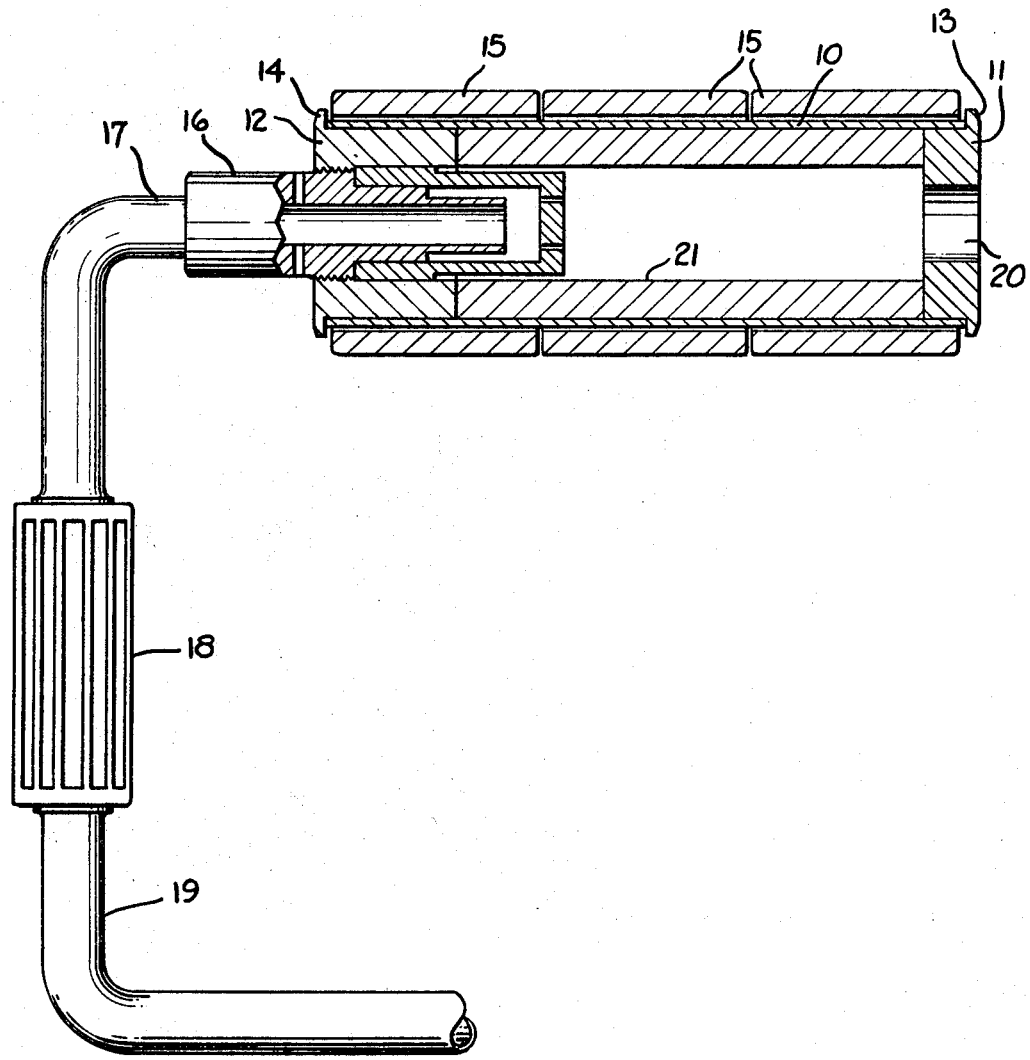

3,390,673
HEATED SEALING TOOL
Charles Edson Ernst, Elizabeth, N.J., assignor to Johns-Manville Corporation, New York, N.Y., a corporation of New York
Filed Mar. 28, 1967, Ser. No. 626,547
10 Claims. (Cl. 126—410)

ABSTRACT OF THE DISCLOSURE

A tool for thermally activating and securing heat sensitive sealing materials having as means therefor heated multiple segment rollers loosely mounted on a supporting or bearing axle to permit both rotation and free movement radially thereof independently of each other.

Background of the invention

Thermally sensitive or activated securing and sealing materials comprising thermoplastic films, and tapes and sheets of plastic films, metal foil, open or closed woven fabric, paper, etc., containing adhesive or sealing constituents of thermoplastic or thermosetting properties have become common and achieved extensive application in fields other than the well-known packaging of food stuffs and general merchandise wherein the typical demands made upon the packaging and sealing materials are not particularly exacting and normally of a temporary and relatively limited duration. One of the recent and rapidly expanding areas of utility of securing, affixing or sealing with such thermally activated tapes, sheets, film and the like, is the building industry in the application and sealing of insulations and construction of hot and cold air heating and cooling duct systems and pipes of various compositions or materials including the currently common ducts formed of, or insulated with, fibrous materials which are in general of relatively low density, highly open or porous structure, and of varying degrees of resiliency, depending in part upon the fiber content and/or amount of binder present. The open or discontinuous surface of such fibrous felts or masses, whether or not covered with plastic foil or other sheet material as is common with such insulations or duct products, together with their typical resiliency of varying and often irregular degree, presents a difficult surface to effectively adhere to and seal against air or other gaseous transmission, especially to the point of effecting a substantially permanently enduring seal normally opposing substantial gas pressure differentials and which must be preserved throughout the life of the structure or heating or cooling system. Moreover in heating and cooling ducts constructed of bonded fibrous material, the joints are frequently united with metal staples or other rigid fasteners, which present protrusions on the otherwise resilient surface to be sealed.

Available and common heated sealing means for sealing packages, uniting and fusing seams and other applications of thermally activated films, tapes, etc., comprising heated flat irons or rollers have been found wanting in not achieving effective and permanent adhesion and sealing when applied to materials commonly employed in building constructions and especially insulations and heating and cooling ducts.

Summary of the invention

This invention relates to an improved device or tool and method for more effectively thermally activating and securing heat sensitive sealing materials such as thermoplastic film, and tapes or sheets with thermoplastic or thermosetting adhesive constituents and effecting a more uniform affixing and adhesion which in turn produces a stronger, more lasting and complete seal against gaseous transmission. The device includes means for applying apt temperatures to effect thermally induced adhesion together with contact pressures comprising heated multiple segment rollers rotatably and loosely mounted in a free floating manner independent of each other on a carrying or bearing shaft or axle having therein a stationary heat source.

The principal objects and advantages of this invention include a more efficient and effective means of obtaining a secure leak-proof seal with thermally activated sealing materials and in a broad expansion which is permanently enduring, and comprises a tool which permits freedom of movement with varying pressure along the length of the roller surface and with change in direction of travel minimizing sliding or shedding and in turn damage to materials applied to, is economical to construct and operate, and easy to apply.

Brief description of the drawing

The above and other objects and advantages of the improved novel device of this invention will become more apparent from the hereinafter detailed description and accompanying drawing illustrating a longitudinal view, with part in section, of the apparatus.

Description of the preferred embodiment

Referring to the drawing there is shown a preferred construction, with part in section, of the device of this invention illustrating the independently free floating and rotatable multiple roller sleeves carried on the fixed tubular shaft providing a bearing axle and having therein a stationary heat source. In the drawing the tubular shaft 10, preferably formed of stainless steel to resist wear and oxidation deterioration under attendant high temperature service conditions, is provided with closing end pieces or heads 11 and 12 inserted into the tubular shaft 10 or otherwise aptly secured thereto. Each closing end piece 11 and 12 is provided with at least one flange member 13 and 14, respectively, extending radially, or perpendicularly to the longitudinal axle of the tubular shaft beyond the outer circumferential surface of the tubular shaft 10 to provide stops. The closing end pieces 11 and 12 are preferably annularly extended radially about and beyond the outer circumferential surface of the tubular shaft, but may be constructed as a single segment extension or plurality thereof simply in any manner to provide a stop inhibiting lateral sliding movement beyond the terminal ends of the shaft. The closing end pieces are most effectively constructed of brass or other like soft and relatively high heat conductive material which can be readily inserted within the tubular shaft with a press fit.

Concentrically mounted on the tubular shaft 10 are multiple cylindrical sleeve rollers 15, preferably formed of sintered metal consisting of brass plus steel, copper and graphite for high temperature lubrication and consisting of a standard commercially available sintered metal bearing product. The multiple sleeve roller segments are concentrically mounted in a relatively loose fitting relationship on the tubular shaft which functions as a supporting bearing axle with adequate clearance between the outer surface of the shaft and the inner surface of the rollers to permit free rotation of the sleeve rollers about the shaft and movement of each roller segment radially, independently of each other on the shaft. An annular radial clearance of at least about 0.0040 inch between the outside surface of the tubular shaft and the inside surface of the roller segments provides effective clearance for both free rotation over the encountered temperatures and independent free floating movement while the projecting flanges 13 and 14 of the end pieces inhibit lateral movement retaining the multiple sleeve rollers in position on the tubular shaft. To prevent the flanges 12 and 13 from impeding the rolling action of the sleeve rollers 15 on a surface, the flanges should terminate below the outer circumferential surface of the multiple cylindrical sleeve rollers regardless of their relative movement on the tubular sleeve.

Heating means for the sealing tool of this construction consists of a fluid fuel burner preferably with the burner means or nozzle 16 positioned within and secured, as by a press fit, in one closing end piece such as 12 whereby a single burner means or heat source effectively heats the combined length of the rollers. The burner nozzle 16 may constitute a standard type of gas burner commonly utilized with butane or propane torches and although the preferred location is as illustrated fitted within the closing end piece, it can be positioned entirely without or within the end piece and tubular shaft. The opposite end piece 11 from the heating means is provided with an appropriately sized opening 20 to permit the escape of combustion products and function as a choke for optimum operation.

Preferably the tubular shaft 10 is provided with a cylindrical sleeve insert 21 concentrically positioned within the tubular shaft intermediate the closing end pieces 11 and 12. The sleeve insert 21, expeditiously tightly friction fitted within the shaft and abutting the end pieces, is composed of a high heat conductive metal such as aluminum, copper or silver, and thus facilitates the operation of the tool by providing high heat conductivity for more uniform temperature distribution.

The fluid burner assembly means, or end piece 12 if the burner means is located interiorly, is connected with a fluid fuel conduit such as pipe 17, preferably provided with an approximately 90° bend to facilitate the application of the rollers 15 to a surface, and optionally is provided with a handle 18 to render the device more handleable. The pipe 17 or other apt fuel conduit is in turn connected through a controllable pressure regulator with a source of fluid fuel as by means of a hose 19 or other apt connections.

The heating of a thermally sensitive material to an effective degree to affix and seal it being a function of the roller temperature and time and area of contact, a given temperature level as for example provided by thermostatic control has proven in service not be be suitable, and even with an adjustable thermostat and suitable heating element, adequate sensing of the variable heat removed during use is difficult to attain. Accordingly, it has been found that a heat source adjustable over a range of heat input is more suitable. For example, for many thermally sensitive thermosetting or thermoplastic adhesives an adjustable heat input providing a temperature range of about 350° to 550° F. typically gives satisfactory operation and effective sealing. These temperatures can be effectively achieved with conventional propane or butane equipment incuding commercial gas burner nozzles, incorporated into the described device of this invention.

A typical preferred heated roller tool in accordance with the precepts of this invention can conveniently be constructed utilizing many available commercial components and equipment. For instance, the tubular shaft providing the bearing axle can be effectively constructed of a length of 20 gauge chrome-nickel-molybdenum (Type 304) stainless steel tubing one inch outside diameter by 0.0040 inch thick, reduced by grinding 0.0040 of an inch, in a length of 3 1/16 inch for a 3 inch wide roll. The tubular shaft may then be press fitted with an aluminum insert to improve heat conduction for uniform distribution throughout the length thereof. Circumferentially mounted on the outside of the tubular shaft are three individual standard sintered metal bearings consisting of brass plus steel, copper and graphite, each measuring 1 inch inside diameter by 1/8 inch thick by 1 inch long to provide the free floating roller sleeves. The ends of the tubular shaft are closed with press fitted annularly flanged end pieces composed of brass and having centrally thereof orifices with one design to take a press fit of a conventional fluid fuel nozzle and the other an outlet and choke. This type of construction and bearing has been found to be superior to equivalent needle bearings with silicone lubricant, and provide far more effective heat conductors with substantially lower rolling friction. The burner nozzle of course can be connected through any suitable means to a controllable pressure regulator and with a tank or other reservoir of liquid fuel, and effectively operated at a normal range of 3 to 12 p.s.i. from a standard propane tank.

The heat sealing tool of the aforedescribed construction and dimensions when fired to a surface temperature in the order of 450° F. with propane fuel and a conventional propane burner nozzle was found to produce a decidedly more uniform and superior affixing and sealing with commercial thermosensitive tape applied to low density, about 3.5 pounds per cubic foot, resin bonded glass fiber air duct faced with thin aluminum foil. The male-female butt points of this duct secured with metal clinching staples and covered with an aluminum tape having thereon a pressure and heat sensitive adhesive, were readily uniformly adhered and sealed over the entire surface of the tape including areas immediately adjacent to the metal clinching staples notwithstanding the compressibility of the underlying fibrous mass and the interference of the staple. It was also found that in addition to applying temperature and pressure more uniformly across the expanse of the roller that this construction minimized damage to the material surfaces.

It will be understood that the foregoing details are given for purposes of illustration, not restriction, and the variations within the spirit of this invention are intended to be included within the scope of the appended claims.

What I claim is:

1. A tool for activating and sealing thermally sensitive materials comprising, in combination: a tubular shaft providing a roller bearing surface, and having closing end pieces with each of said end pieces having at least one flange member extending radially beyond the outer circumferential surface of the tubular shaft; multiple cylindrical sleeve rollers concentrically mounted on the said tubular shaft in a loose fitting relationship to provide clearance for independent free radial movement and rotation; said flange members of each closing end piece extending sufficiently to retain the multiple cylindrical sleeve rollers laterally positioned on the said tubular shaft but not extending beyond the outer circumferential surfaces of the multiple cylindrical sleeve rollers; one of the said closing end pieces having an orifice therein providing an inlet for a source of heat consisting of a fluid burner and the other of the said closing end pieces having an orifice therein providing an outlet and choke for the fluid burner.

2. The tool of claim 1 wherein the heat source consists of a gas burner nozzle positioned within the orifice of the said closing end piece.

3. Tool of claim 1 wherein a cylindrical sleeve insert is concentrically positioned within the tubular shaft providing the roller bearing surface and intermediate between the closing end pieces.

4. The tool of claim 3 wherein the closing end pieces consist of inserts positioned within the terminal ends of the tubular shaft with flange members extending radially beyond the outer circumferential surface of the tubular shaft.

5. The tool of claim 4 wherein the flange member of each closing end piece extending radially beyond the outer circumferential surface of the tubular shaft is annular.

6. The tool of claim 5 wherein the multiple cylindrical sleeve rollers concentrically mounted on the tubular shaft are of a diameter to provide an annular radial clearance about the tubular shaft of at least about 0.0040 of an inch.

7. The tool of claim 6 wherein the multiple cylindrical sleeve rollers concentrically mounted on a tubular shaft in a loose fitting relationship are each not in excess of about 1 inch in length.

8. The tool of claim 7 wherein the gas burner nozzle is provided with a fluid conduit means for connection to a supply of fluid fuel.

9. The tool of claim 8 wherein the multiple cylindrical sleeve rollers are composed of a combination of sintered metal and graphite.

10. The tool of claim 9 wherein the cylindrical sleeve insert is composed of a highly thermal conductive and relatively oxidation resistant metal selected from the group consisting of aluminum, copper and silver.

References Cited

UNITED STATES PATENTS

| | | | |
|---|---|---|---|
| 790,050 | 5/1905 | Hall | 158—22 |
| 1,025,502 | 5/1912 | Adamson | 158—22 X |
| 2,990,755 | 7/1961 | Caufield. | |
| 3,039,455 | 6/1962 | Corey | 126—271.2 |

CHARLES J. MYHRE, *Primary Examiner.*